United States Patent [19]
Martin

[11] 3,950,151
[45] Apr. 13, 1976

[54] POLLUTION CONTROL APPARATUS AND METHOD

[75] Inventor: Robert Thomas Martin, Salt Lake City, Utah

[73] Assignee: Air Pollution Research System, Salt Lake City, Utah

[22] Filed: Apr. 15, 1974

[21] Appl. No.: 460,758

[52] U.S. Cl. ................ 55/95; 55/92; 55/227; 55/248; 55/257; 261/79 A; 261/119 R
[51] Int. Cl.² .................................. B01D 47/02
[58] Field of Search .......... 55/92, 95, 239, DIG. 36, 55/244–248, 257, 227; 261/79 A, 119 R

[56] References Cited
UNITED STATES PATENTS

| | | | |
|---|---|---|---|
| 1,062,446 | 5/1913 | Ernst | 55/230 |
| 2,213,881 | 9/1940 | Lauer | 55/440 |
| 3,240,000 | 3/1966 | Hayes et al. | 55/459 |
| 3,546,851 | 12/1970 | Hardison et al. | 55/239 |
| 3,581,467 | 6/1971 | Donnelly | 55/239 |
| 3,651,622 | 3/1972 | Wisting | 55/404 |
| 3,785,626 | 1/1974 | Bradley, Jr. et al. | 55/257 |
| 3,852,040 | 12/1974 | Gustavsson | 55/248 |

*Primary Examiner*—Bernard Nozick
*Attorney, Agent, or Firm*—Criddle, Thorpe, & Western

[57] ABSTRACT

Apparatus for the removal of noxious material from a contaminated gas stream comprising (1) a lower portion having a liquid reservoir with means for receiving a contaminated gas above the level of said liquid and a substantially vertical elongated duct positioned centrally above said liquid level, (2) a central portion containing fan means positioned in axial alignment above said duct, the operation of said fan means causing an upwardly spiraling vortex of contaminated gases and atomized liquid from the liquid reservoir through said duct and fan means thereby intimately admixing the contaminated gas and atomized liquid and (3) an upper portion through which purified gases exit and wherein the atomized liquid containing said contaminants is coalesced and flows downwardly by gravity to said liquid reservoir.

11 Claims, 7 Drawing Figures

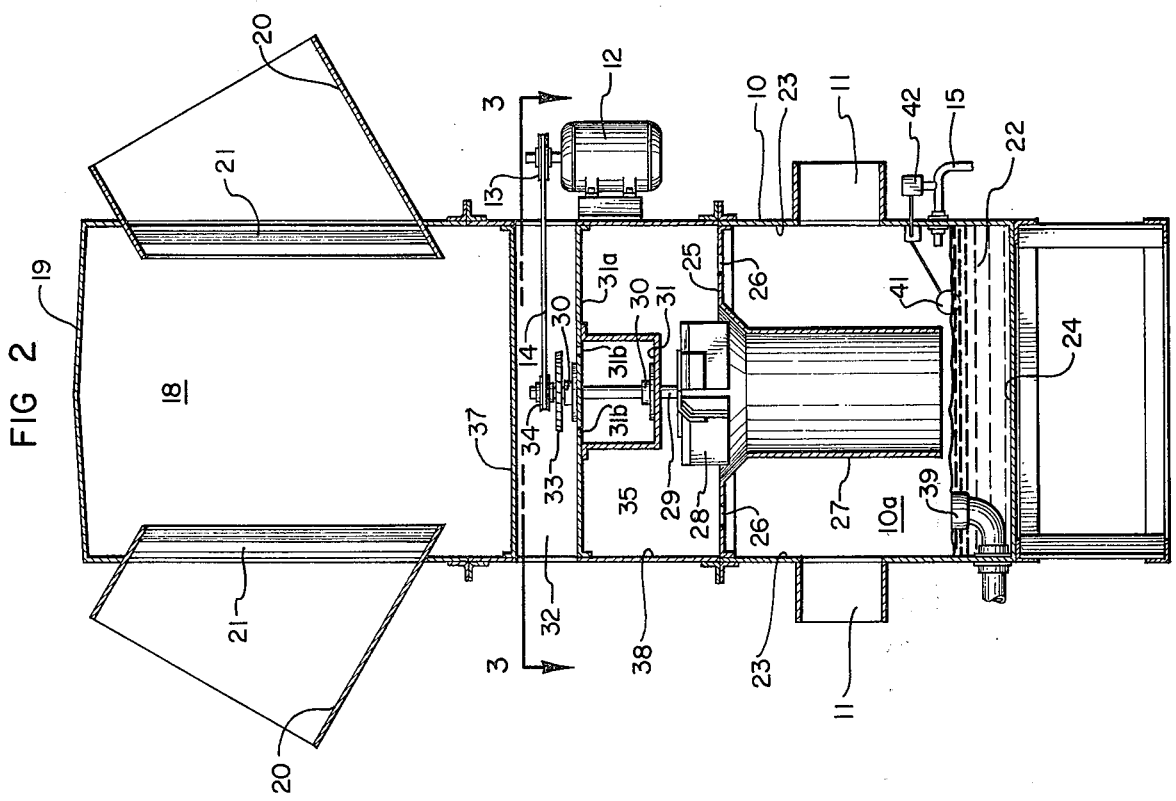
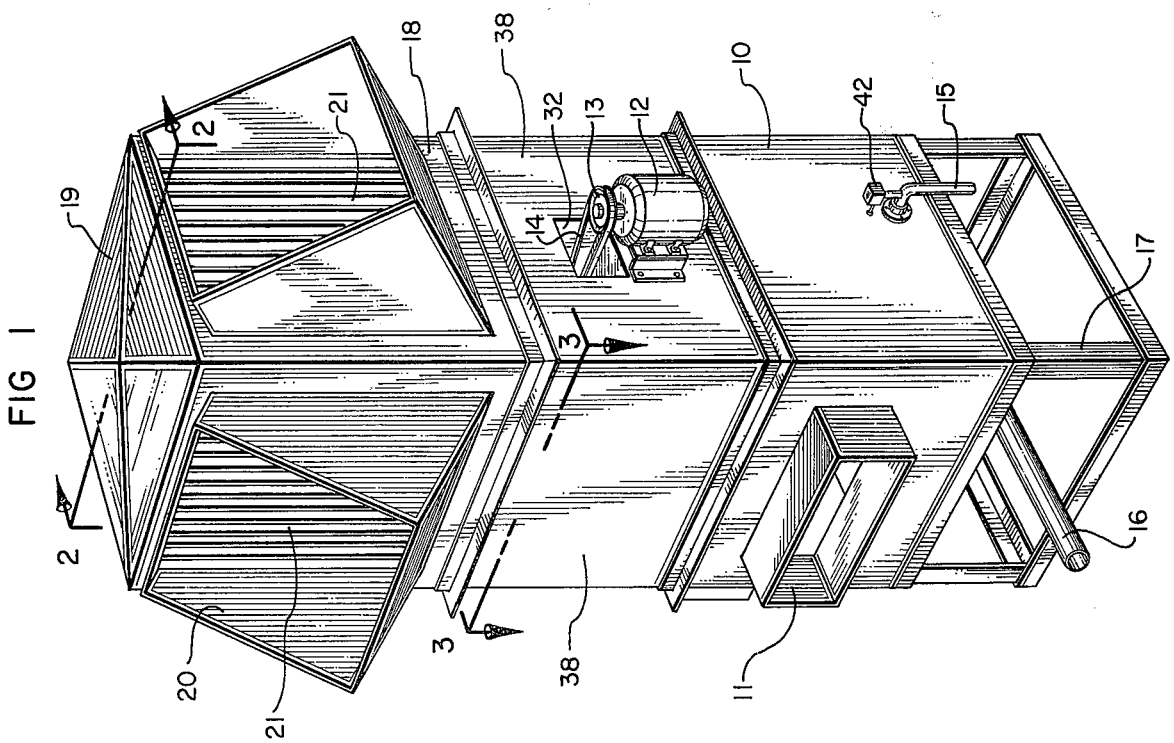

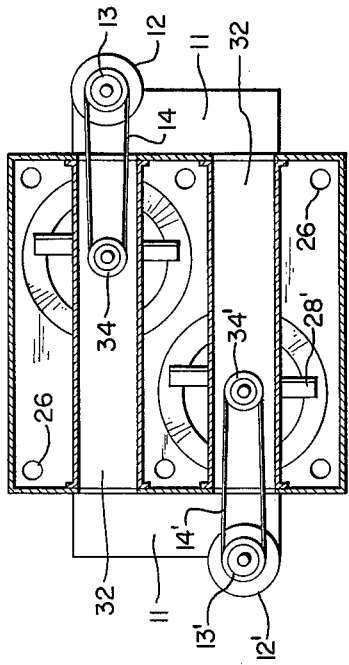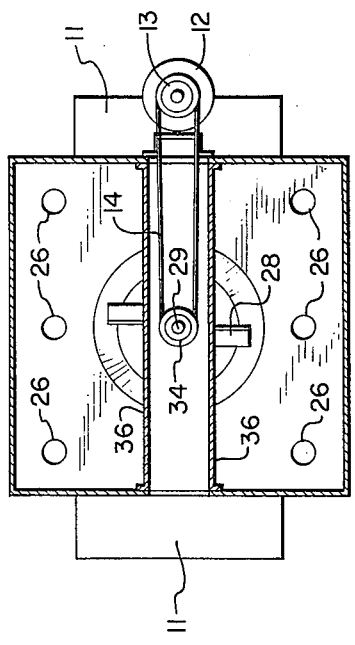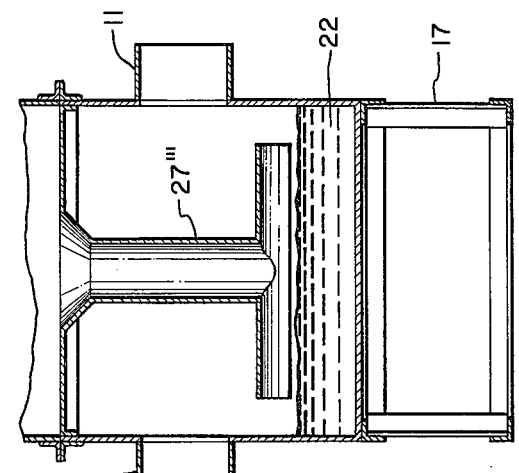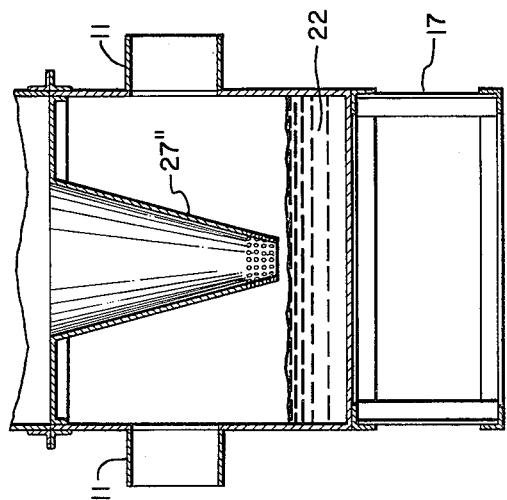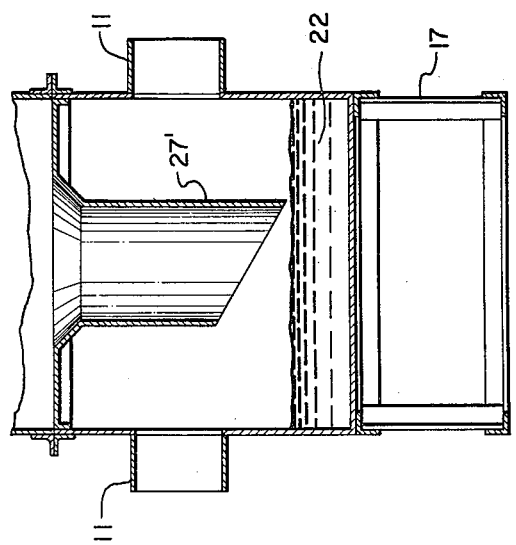

POLLUTION CONTROL APPARATUS AND METHOD

BACKGROUND OF THE INVENTION

This application relates to an apparatus and method for removing noxious materials from contaminated emission gases containing the same. More particularly, this invention relates to an apparatus for either physical or chemical removal of noxious materials from contaminated emission gas streams wherein the contaminated gases are intimately admixed with a finely atomized liquid and the contaminants are transferred from the emission gases to the liquid.

The emission of air-borne contaminants from stack gases and other similar sources has become a major contributor to air pollution and the subject of rather stringent legislation by both federal and state agencies. Air-borne pollutants can exist in several forms. Some are considered to be "particulate matter" which is usually defined as any material emitted as liquid or solid particles or both, e.g. smoke, fly ash, fats, oils, greases, dust, saw dust, metal oxides and salts, and liquid hydrocarbons. Other contaminants are in gaseous forms such as sulfur oxides, mercaptans, sulfides nitrogen oxides, and organic compounds such as carbonyls and volatile hydrocarbons.

With the increase of industrial processes and the ever expanding world population, more and more noxious materials are being released to the atmosphere causing severe air contamination, particularly in heavily populated areas. To stem the tide of rising air pollution, it has become imperative that governmental controls be placed upon the amount of air pollutants which can be emitted into the surrounding environment. As technology becomes more and more proficient, the regulation of air-borne pollutants becomes more stringent.

Various methods and apparatus for the removal of particulate matter from stack gases and the like have been devised. These usually involve the precipitation, agglomeration or entrainment of the air laden particles and function with varying degrees of success. Typical of such air cleansing devices are those found in U.S. Pat. No. 1,062,446, issued May 20, 1913; U.S. Pat. No. 2,937,712, issued May 24, 1960; U.S. Pat. No. 3,248,858, issued May 3, 1966; U.S. Pat. No. 3,348,830, issued Oct. 24, 1967; U.S. Pat. No. 3,488,924, issued Jan. 13, 1970; and U.S. Pat. No. 3,581,463, issued June 1, 1971. These patents all describe devices for the scrubbing of contaminated air with streams of water and, in most cases, involve the use of spray nozzles, as a means of water/gas contact. U.S. Pat. Nos. 3,248,858 and 3,581,467 avoid the use of nozzles in bringing about contact of contaminated gases with a water mist by utilizing either fan means or a rotating cone. In U.S. Pat. No. 3,248,858, a water mist for contact with vaporized grease particles is generated by means of a rapidly rotating inverted truncated cone extending into a water reservoir which pulls the water up through the cone along its outside walls and sprays it outwardly over the top edge in the form of a mist.

In U.S. Pat. No. 3,581,467, water is vaporized by means of a fan which creates an upward, vertical movement of both gas and water vapor through a vertical, uniform diameter, cylindrical duct, which of necessity has a non-horizontal lower portion part of which must be submerged in a water reservoir.

These structures are typical of the prior art. One problem associated with most prior art devices is that they are not suitably equipped to efficiently bring about intimate mixing of contaminated gases with water or liquid particles when large volumes of gases are involved. Sprays from nozzles are directional in nature and may not be evenly distributed throughout the gas-liquid contact zone. Moreover, spray droplets may not be small enough in size to present sufficient surface area to adequately contact all gas contaminants. Nozzles also become plugged presenting time-consuming and costly maintenance problems. Devices such as disclosed in U.S. Pat. No. 3,581,467, are only partially open to the atmosphere for conducting gaseous materials up the duct since the lower portion of the duct must be submerged in a liquid reservoir. The positioning of the duct into the liquid reservoir not only may inhibit the flow of gases into the duct, but limits the lower duct configuration thereby preventing the optimum utilization of the liquid. For example, with the lower portion of the duct below the liquid surface, the vibration of the duct causes the size of the water droplets leaving the surface of the liquid reservoir to be larger than when the duct does not extend below the surface and may cause more liquid to be drawn up in vortical movement through the duct than is necessary. Moreover, larger droplet sizes reduces the liquid surface area and lowers the opportunity for gas-liquid contact.

BRIEF DESCRIPTION OF THE INVENTION

The present invention efficiently and effectively removes particulate and other noxious matter from contaminated gas streams without the use of filters, nozzles, submerged ducts or the like and separates such contaminated matter from the gas streams, thereby allowing for the passage of refined gas streams into the open atmosphere. This is accomplished by an apparatus having lower and middle contact portions and an upper separation portion. The lower portion comprises side, top and bottom walls forming a liquid reservoir. Ports or openings for the introduction of contaminated gases are located in the side walls above the level of the liquid. Positioned centrally in the lower portion is an elongated substantially vertical duct having open ends, the lower end of which is terminated at a predetermined position above the liquid level. The top wall of the lower portion divides the lower from the middle portion and is perforated only to the extent necessary to allow for the gravitational downward flow of liquid from the upper and middle portions as will be later described. The vertical duct is fixedly attached to the top wall and terminates with the top open end opening into the middle portion.

The middle portion has side walls positioned above the lower portion and has fan means fixedly positioned therein in axial alignment directly above the open top end of the elongated vertical duct.

The upper portion is positioned substantially above and attached to the middle portion and has an enclosed top and side walls which contain one or more baffled vents.

The contaminated gas streams enter the apparatus through the ports or openings in the lower portion of the apparatus. The fan means in the center portion is designed to create a vortical movement of fluids in the elongated duct which removes sufficient pressure on the liquid reservoir immediately below the duct to break the surface tension and allow the rapid removal of minute liquid particles from the liquid reservoir up through the duct along with the contaminated emission gases. The gases and liquid particles are brought into intimate contact in the duct and the contaminants are transferred to, or entrained in the liquid particles or, because of the intimate contact, the contaminated particles are brought into contact with each other and agglomerate.

Principal objects of the present invention are to provide apparatus that will effectively remove contaminants from an air stream by entraining the contaminants in a liquid, and agglomerating them such that they will fall from the air stream.

Other objects are to provide an air cleaning apparatus that will withstand high temperatures and the action of chemically active contaminants.

Principal features of the invention include the use of lower, central, and upper chambers of a housing as lower, middle and upper contact portions, respectively; a drive-shaft mounted impeller used as a blower means to pick up contaminated air supplied to the lower chamber and liquid droplets or particles from a liquid supply maintained in the lower chamber and to move them together upwardly through the housing and a drive means that is protected against the temperature and physically or chemically destructive effects of the contaminants.

Additional objects and features will become apparent from the following detailed description and drawings, disclosing what are presently contemplated as being the best modes of the invention.

BRIEF DESCRIPTION OF THE DRAWINGS

FIG. 1 is a perspective view of a preferred embodiment of the invention, taken from one corner and slightly above;

FIG. 2 is a vertical sectional view of the embodiment shown in FIG. 1, taken on line 2—2;

FIG. 3 is a horizontal view of the embodiment shown in FIG. 1 taken on line 3—3;

FIG. 4 is a view that of FIG. 3, but showing another embodiment of the invention; and FIGS. 5, 6 and 7 are fragmentary vertical sectional views illustrating various embodiments of the lower portion of the invention shown generally in FIGS. 1 and 2.

DETAILED DESCRIPTION

Referring now to the drawings:

In the illustrated preferred embodiment as shown in FIG. 1, it can be seen that the apparatus of the invention consists of a lower outer rectangular housing 10, within which are arranged lower, middle and upper contacting portions, respectively. At least one inlet duct 11 is attached to the housing 10, as will be hereinafter described in detail in reference to FIG. 2. A motor 12 is mounted on the side of lower housing 10 and a pulley 13 on the output shaft of the motor is connected to a pulley on an impeller shaft, to be hereinafter described, inside the unit, by means of a V-belt 14. Makeup water enters the apparatus through line 15 and excess of contaminated water leaves the apparatus through drain line 16. The apparatus is supported by a stand 17 which may be of any appropriate configuration. The apparatus will normally be mounted on a roof top adjacent an emission stack. The roof may be flat, pitched or arched so stand 17 will necessarily be adjusted according to the place the apparatus is to be installed. The apparatus further includes a top 19 and ducts 20 in the side wall or top portions thereof. Ducts 20 have baffles 21 through which are or other material within the apparatus must pass before exiting into the outside atmosphere.

The housing illustrated in FIG. 1 could obviously be of other than rectangular cross-sectional configuration. For convenience the apparatus will be further described in terms of a rectangle, but it is to be kept in mind that other configurations are possible and within the scope of the invention.

In operation of the invention contaminated emission gases from a source (not shown) enter the apparatus through inlet duct 11 and move into lower portion 10a of lower housing 10 at a point above the level of liquid 22 maintained in a reservoir formed in the bottom of lower housing 10. The lower portion 10a of lower housing 10 is defined by side walls 23, a bottom wall 24 and a top wall 25 which may have perforations 26 therein. Centrally located in said lower portion and fixedly attached to top wall 25 is an elongate duct 27, FIG. 2, which may also be of various other configurations as illustrated in FIGS. 5, 6 and 7, at 27', 27'', and 27''', respectively. Duct 27 terminates at a predetermined point above the surface of liquid reservoir 22. Impeller 28 is attached to shaft 29 which is journaled by bearings 30 carried by spaced supports plates 31 and 31a. An upper end of shaft 29 extends into an open ended conduit or air passageway 32 into which cooling air from outside the apparatus can circulate. While not always required, a shaft cooling fan 33 can be mounted on the shaft in passageway 32 for directing cooling air downwardly along the shaft. A pulley 34 on the shaft 29 is driven by the motor 12 through pulley 13 and belt 14. The drive mechanism including pulley 34 and 13, shaft 29, belt 14 and motor 12 are shielded from the incoming contaminated gases by plate 31, which forms the lower wall of a box surrounding shaft 29. The box is enclosed on the sides by walls 35 and on top by plate 31a, and the plate 31a extends fully across the apparatus as shown to form the lower portion of air passageway 32. Air passageway (conduit) 32 is further defined by spaced side walls 36, as best shown in FIG. 3, and by a top wall 37. Ports 31b through plate 31 allow air to be directed downwardly by fan 33 into the box, around and over the bearings 30 and out of the box and back into the conduit 32.

Through the drive mechanism described, operation of motor 12 causes the impeller to turn, thereby creating a vortical movement of air upwardly through elongated duct 27. The vortical air movement draws contaminated air from the inlet duct 11 upwardly into duct 27. The upward flow of air into duct 27 is sufficiently strong to create an area of negative or reduced pressure on the surface of liquid 22 immediately below the duct 27. Due to the reduced surface pressure the vortical movement of air on the liquid surface is sufficient to break the surface tension of the liquid and small particles of liquid are entrained in the air and are moved upwardly through duct 27. During such movement, the liquid particles come into intimate contact with the contaminants drawn into duct 27 from inlet duct 11. The volume of liquid drawn into the duct and the size of the liquid particles may be varied by varying the distance of the bottom of duct 27 from the surface of the liquid 22, varying the diameter of duct 27, and/or varying the speed of impeller 28. In general, with other variables constant, the closer the bottom of duct 27 is to the liquid surface the larger the liquid particles will be and the greater the total volume of liquid moved. The correct duct size, impeller speed and distance from duct to water is best determined empirically for each operation.

It is important that the impeller 28 operate to create an upward flow of air through duct 27 that is greater than or equal to the flow of air entering the apparatus through inlet duct 11. So arranged, there is no back pressure in the source stacks and all contaminants are drawn into the apparatus. The air flow should also be so controlled that too much air will not be drawn through the stack and into the apparatus. Should this occur, for example, in a cooking oil operation, the movement of too large a volume of air through the stacks could cause a reduction in the temperature of the cooking oil and necessitate an increased use of fuel to keep the oil at the proper cooking temperature.

The contaminated air and liquid are intimately admixed in elongated duct 27 and the contaminants are transferred from the air to the liquid particles. The term "transferred" is used broadly because the mode of transfer will depend upon the type of contaminant and liquid used. Solid or liquid particles such as dust, fly ash, smoke, liquid hydrocarbons, and oils may be entrained by the liquid. Gaseous contaminants, such as sulfur gas, may be absorbed by or reacted with the liquid.

The liquid-air mixture is propelled upwardly through the upper open end of duct 27 into a center section of the apparatus, where it passes into and through, or around impeller 28. The forces surrounding the impeller cause the liquid particles to remain in a finely divided form. The liquid-air mixture is further intimately admixed and propelled by centrifugal force outwardly toward the walls of center section 38. After passing through the immediate influence of impeller 28 into center section 38, the gas-liquid mixture is allowed to expand, cool and hense decrease in velocity. Some of the mixture impinges on the walls of center section 38, and it is in the center portion 38 of the apparatus that the liquid particles begin to agglomerate or coalesce. Those particles, which grow so heavy that they cannot be carried by the upwardly moving air, gravitate to top wall 25 and drop through the perforations 26 back into liquid 22. The remainder of the liquid-air mixture is carried upwardly around air passageway 32 and into separation section 18 where further cooling and reduction in the air velocity takes place. The bearings 30 and drive shaft 29, pulley 34 and belt 14 are all protected from physical or chemical damage that could occur by the box supporting the bearings and the conduit or air passageway 32. In addition, the cooling, circulating air drawn into passageway 32 by the impeller 28 serves to cool the air-liquid mixture passing upwardly through the housing. This cooling helps to speed up coagulation and agglomeration. At least the bulk of the contaminated liquid particles carried into separation section 18 condense, coalesce or agglomerate in the separation section and return by gravity flow through center section 38 and perforations 26 to the liquid 22. The refined air leaves the separation section through vents 20 having baffles 21 located therein. The baffles prevent the direct flow of air through the vents and cause impingement of any remaining liquid particles containing contaminants. The impinging particles then flow down the sides of the baffles to the vent 20 which has a bottom floor angled upwardly and outwardly with respect to the separation section 18. The liquid captured in this manner thus flows down the bottom floor and down the inside walls of the separation section 18 before being returned to the liquid reservoir in the manner already described. The air passing through the vents 20 is thus refined and the contaminants removed therefrom are returned to the liquid reservoir.

It is possible that in some operations involving use of the apparatus of the invention, high temperatures will be involved. For example, in a veneer drying operation, temperatures in the order of 350° to 375° F are often encountered. Superheated steam and resinous products are drawn into the apparatus of the invention. The resins and steam particles are partially cooled and become intimately admixed with water particles from the liquid 22. In the separation section the temperature is well below the boiling point of the resins and the water entrained resinous particles coalesce and are returned to the liquid reservoir. The temperature may be sufficiently high, however, that a steam plume will exit through vents 20. Prototype operation has shown however that such a plume is virtually free of contaminants.

In some instances, such as where a steam plume from vents 20 is undesirable or when a chemical reaction is to be carried out sequentially, it may be desirable to have two or more apparatus in series and duct the exit gases directly from the separation section of one apparatus into the lower section of another similar or identical apparatus.

The contaminated liquid flows down into the liquid reservoir 22 as described and in a majority of cases the contaminants, being less dense than the liquid, float to the surface. In such a case, the contaminants are withdrawn from the reservoir surface through overflow pipe 39 and the liquid is recycled through the system. Makeup liquid is added through inlet pipe 15 as needed to keep the reservoir at a constant level. The liquid level is maintained by any suitable level responsive device and control valve. A conventional float 41 and a solenoid valve 42 in the inlet pipe 15 may be used, for example.

FIGS. 5, 6 and 7 illustrate other various configurations that vertical elongated duct 27 can have and it will be apparent that other suitable configurations can also be used. The open lower end of the duct may be non-horizontal, as shown in FIG. 5 at 27'. FIG. 6 illustrates a duct 27" of truncated cone configuration, wherein the smaller lower portion of the side wall is perforated to allow gases to impinge upon and flow through the perforations as well as through the extreme open end. FIG. 7 shows an elongated vertical duct 27''' wherein a horizontal convex semi-circular duct is attached to and surrounds the open lower end for channeling of contaminated gases from inlet 11 to each duct 27'''. As shown in FIG. 7, more than one inlet duct 11 can be used, if desired.

If it is desired to increase the air volume moving through the apparatus beyond the capacity of a single impeller, more than one may be used. FIG. 4 illustrates a cross sectional view of FIG. 2 taken along line 3—3, but modified to contain dual impellers 28 and 28'. It will be seen that motors 12 and 12', motor pulley 13 and 13', belts 14 and 14' and shaft pulley 34 and 34' are used for duel impellers. Each impeller is mounted over a substantially vertical elongated duct. The ducts need not be of the same length and diameter nor need the impellers be in the same horizontal plane.

Although preferred forms of my invention have been herein disclosed, it is to be understood that the present disclosure is by way of example, and that variations are possible without departing from the subject matter of the following claims, which subject matter I regard as my invention.

I claim as my invention:

1. A method for removing contaminants from a contaminated gas stream consisting of
   1. providing an apparatus comprising
      a. a housing having lower, central and upper chambers formed therein;
      b. perforated divider means separating the lower and central chambers;
      c. a liquid in the lower chamber;
      d. means for maintaining the liquid at a substantially constant level in the lower chamber;
      e. a contaminated gas inlet to said lower chamber at a location above the level of the liquid;
      f. a duct supported by the housing and having an open lower end positioned a spaced distance above the level of the liquid and an open upper end in the central chamber;
      g. blower means including a drive shaft and an impeller on the lower end of the drive shaft, said blower means being supported by the housing and positioned in the central chamber, above the open upper end and arranged to pull air from within the duct and to direct said air into the upper chamber;
      h. a fully open conduit extending through the central chamber above the blower means and transversely to flow of air through the duct;
      i. a pulley in the conduit and fixed to the upper end of the drive shaft;
      j. drive means for driving the blower means comprising a motor fixed to the exterior of the housing, and a belt extending into the conduit to drivingly interconnect the pulley fixed to the upper end of the drive shaft and a pulley on the output shaft of the motor;
      k. at least one discharge duct extending upwardly and outwardly from the upper chamber; and
      l. vertically extending baffle means, arranged in each said discharge duct, such that air cannot pass through said duct in a straight path, whereby contaminants and water impinging on the baffle means gravitates down the baffle means and the housing, through the upper and central chambers, through the perforated divider and into the liquid in the lower chamber;
   2. drawing the contaminated gas stream into the lower chamber through the contaminated gas inlet,
   3. operating said blower means such that the surface tension of the liquid immediately below the duct is reduced and particles of liquid and the contaminated gas stream are drawn upwardly through the duct and central chamber of the apparatus being intimately admixed therein thereby transferring the contaminants from the contaminated gas stream to the liquid particles, and
   4. passing the liquid particles and gas stream into the upper chamber by said blower means whereby the velocity of the liquid particles and gas stream decreases and the liquid particles containing the contaminants coalesce or impinge on the walls or baffle means of the upper chamber and gravitate down the baffles and having, through the upper and central chambers, through the perforated divider and into the liquid in the lower chamber, and
   5. venting the gas stream from which the contaminants have been removed through said baffle means.

2. The process according to claim 1 wherein the contaminant is a hydrocarbon oil and is physically removed by said liquid.

3. The process according to claim 1 wherein the contaminant is a malodorous substance physically removed by said liquid.

4. The process according to claim 1 wherein said contaminant is a finely divided solid particulate and is physically entrained by said liquid.

5. The process according to claim 1 wherein said contaminant is a gaseous chemical which is chemically reacted with said liquid.

6. Apparatus for removing contaminants from contaminated gases comprising
   a. a housing having lower, central and upper chambers formed therein;
   b. perforated divider means separating the lower and central chambers;
   c. a liquid in the lower chamber;
   d. means for maintaining the liquid at a substantially constant level in the lower chamber;
   e. a contaminated gas inlet to said lower chamber at the location above the level of the liquid;
   f. a duct supported by the housing and having an open lower end positioned a spaced distance above the lever of the liquid and an open upper end in the central chamber;
   g. blower means including a drive shaft and an impeller on the lower end of the drive shaft, said blower means being supported by the housing and positioned in the central chamber, above the open upper end and arranged to pull air from within the duct and to direct said air into the upper chamber;
   h. a fully open conduit extending through the central chamber above the blower means and transversely to flow of air through the duct;
   i. a pulley in the conduit and fixed to the upper end of the drive shaft;
   j. drive means for driving the blower means comprising a motor fixed to the exterior of the housing, and a belt extending into the conduit to drivingly interconnect the pulley fixed to the upper end of the drive shaft and a pulley on the output shaft of the motor;
   k. at least one discharge duct extending upwardly and outwardly from the upper chamber; and
   l. vertically extending baffle means arranged in each said discharge duct, such that air cannot pass through said duct in a straight path, whereby contaminants and water impinging on the baffle means gravitates down the baffle means and the housing, through the upper and central chambers, through the perforated divider and into the liquid in the lower chamber.

7. The apparatus claimed in claim 6, wherein said duct is cylindrical and the bottom of said duct is horizontal.

8. The apparatus claimed in claim 6, wherein the lower portion of said duct is perforated.

9. The apparatus claimed in claim 6, wherein the duct is in the form of a truncated cone.

10. The apparatus claimed in claim 6, wherein the bottom of said duct is non-horizontal.

11. Apparatus as in claim 6, further including
a. a fan blade in the conduit and fixed to the drive shaft to force air along the drive shaft in the direction of the impeller;
b. a box fixed to and beneath the conduit;
c. bearing means in the conduit and the box through which the drive shaft is journalled; and
d. openings through the conduit into the box whereby air circulated from rotation of the fan blade with the drive shaft will pass over the bearing means and additional openings through the conduit into the box whereby air circulated over the bearings is moved into the conduit.

* * * * *